United States Patent [19]
Beecher

[11] Patent Number: 4,568,154
[45] Date of Patent: Feb. 4, 1986

[54] SPECTACLE TYPE MOUNTING ASSEMBLY FOR BINOCULAR

[76] Inventor: William J. Beecher, 1960 Lincoln Park West - Apt 1910, Chicago, Ill. 60614

[21] Appl. No.: 580,816

[22] Filed: Feb. 16, 1984

Related U.S. Application Data

[63] Continuation-in-part of Ser. No. 344,062, Jan. 29, 1982, Pat. No. 4,477,790.

[51] Int. Cl.⁴ .............................................. G02B 23/18
[52] U.S. Cl. .............................................. 350/549
[58] Field of Search ............................. 350/248-249, 350/145-146, 547-555; 351/155-158

[56] References Cited

U.S. PATENT DOCUMENTS

| | | | |
|---|---|---|---|
| 558,889 | 4/1896 | Wittmann | 350/547 |
| 2,848,924 | 8/1958 | Potez | 351/156 |
| 3,985,421 | 10/1976 | Beecher | 350/552 |

FOREIGN PATENT DOCUMENTS

| | | | |
|---|---|---|---|
| 442389 | 6/1912 | France | 351/155 |
| 21341 | 3/1911 | Norway | 351/156 |

*Primary Examiner*—William H. Punter

[57] ABSTRACT

An easily-adjusted spectacle frame, designed to cooperate with the compact and lightweight binocular of patent application Ser. No. 344,062, now U.S. Pat. No. 4,488,790, entitled BINOCULAR AND SPECTACLE TYPE MOUNTING ASSEMBLY THEREFOR, of which this application is a continuation in part. A primary object of the invention is to permit accurate alignment before the eyes of the user of a high performance 7 power binocular for wearing comfort comparable to that in ordinary eyeglasses. This requires that the binocular have the hinge connecting the paired telescopes tapped for a set-screw, which slides in a verticle slot located at the nose bridge of the spectacle bow. This adjusts for the up-and-down movements of the eyepieces as the binocular hinge is opened and closed to accommodate the varying interpupillary requirements of users, whether the eyes be close together or wide apart. A major feature is that the spectacle frame is completely unseen by the wearer.

4 Claims, 5 Drawing Figures

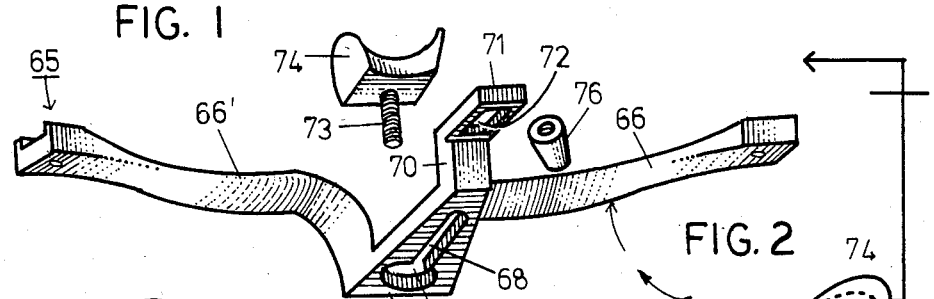
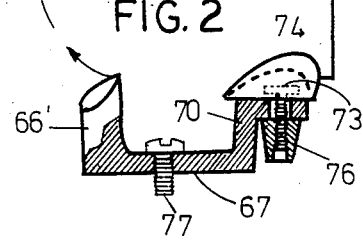
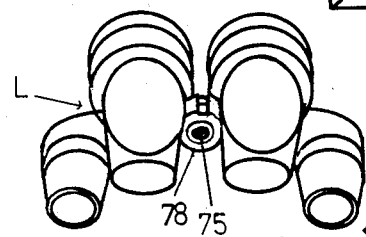
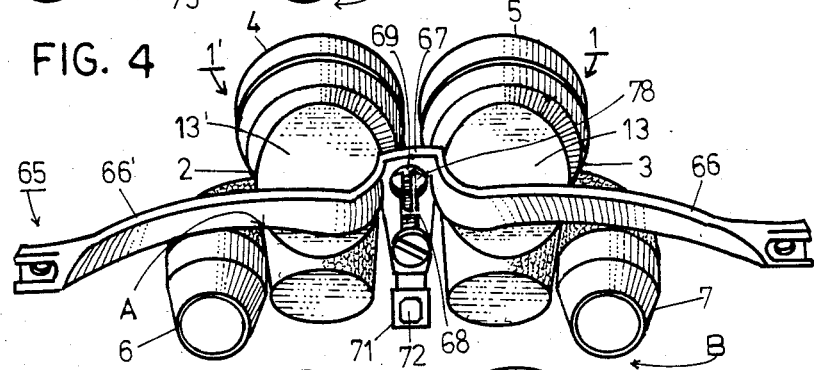
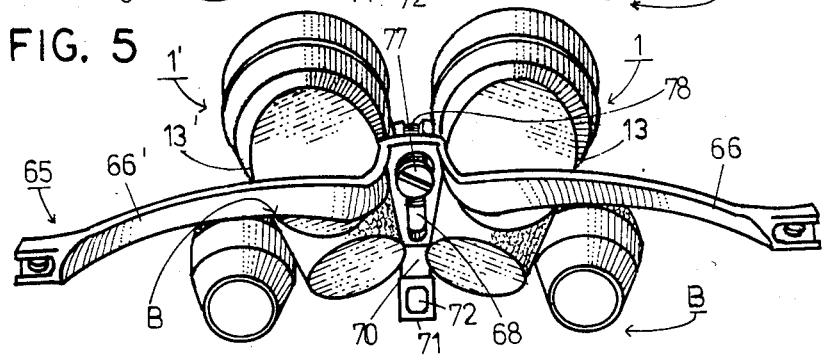

SPECTACLE TYPE MOUNTING ASSEMBLY FOR BINOCULAR

This patent application is a continuation in part of my patent application Ser. No. 344,062, filed on Jan. 29, 1982 and now U.S. Pat. No. 4,477,790, entitled BINOCULAR AND SPECTACLE-TYPE MOUNTING ASSEMBLY THEREFOR.

DESCRIPTION

1. Technical Field

This spectacle assembly is designed to cooperate uniquely with the binocular described in U.S. Pat. No. 4,488,790. That binocular is readily and quickly mounted on the assembly to furnish a lightweight, compact combination which approaches the convenience of the ordinary spectacle in that the mass of the binocular is little seen by the viewer and the mounting frame seen not at all. An outstanding feature of the invention is that the binocular may be quickly and accurately mounted on the spectacle assembly in such a manner that the instrument is correctly aligned with the eyes for viewing.

2. Background Art

Rudolph Wittman in his U.S. Pat. No. 558,889 of April 21, 1896, entitled OPERA GLASS HOLDER, appears to have been the first to address the problem of mounting a binocular on a spectacle frame for wearing on the face but his problem and the solution were simple since his 2 power opera glass had no interpupillary adjustment for differences in width between the eyes and no need to lower or raise the nosepiece. Alonzo Hurst in his U.S. Pat. No. 2,659,270 of Nov. 17, 1953, entitled SPECTACLE TEMPLE, and Dixon P. Downey in his U.S. Pat. No. 3,728,012 of Dec. 15, 1971, entitled EYEGLASSES WITH RETAINER, dealt with the temples of the spectacle, which I accept as being already in the art. My invention is limited strictly to the bow portion of the spectacle frame with its accompanying nosepiece and, for a really sophisticated binocular, this requires complex designing.

The problem of creating a spectacle frame that will fit a wide range of individuals to a 7 power, high performance binocular deserves brief attention. The two telescopes of such a sophisticated binocular are hinged together and the user must move the eyepieces apart or together on this hinge to match his particular interpupillary distance (space between the eyes), which varies in normal people between about 55 mm and 75 mm. When a person with the extreme 75 mm widths adjusts the binocular to merge the two circles of view stereoscopically into one as a preliminary to focusing the instrument, he moves the eyepieces outward and upward with respect to the level of the hinge. If the person, on the other hand, has a 55 mm width, he moves the eyepieces inward and downward with respect to the hinge. The hinge of the Beecher binocular is tapped for a set screw to afix the spectacle frame to the binocular, and the spectacle bow has a vertical slot, located at the nose bridge, in which the binocular (by means of the set screw) may move up and down to compensate for the movements abovementioned.

DISCLOSURE OF THE INVENTION

This invention aims to create a spectacle frame that will fit all normal individuals to a 7 power, high performance binocular so as to provide complete viewing comfort. It is devised specifically for the Beecher Binocular of U.S. Pat. No. 4,488,790, which includes a pair of telescopes hinged together, each telescope body shell containing four oval mirrors of varying size to match the changing cross-section of the light bundle formed by the objective lens at the front end and the eyepiece at the rear end. To provide the folded light path between objective and eyepiece, each body shell is formed of a larger vertical and smaller horizontal frusto-conical tubular section joined at a right angle and each section is provided with a mirror cover for each pair of mirrors. Since the larger, vertical cover is on the eyepiece side of the binocular, it is convenient to use its larger facet to guide the bow, attached by its setscrew to the hingepost. The user must move the eyepieces apart or together on this hinge to match his particular interpupillary distance, which varies in normal people between 55 mm and 75 mm. When a person with 75 mm width adjusts the binocular to merge the two circles of view stereoscopically into one, he moves the eyepieces outward and upward with respect to the level of the hinge. The person with a 55 mm width moves the eyepieces inward and downward. The hinge is tapped for a setscrew to afix the spectacle bow to the binocular, and the bow has a vertical slot in its triangular bridge in which the binocular may move up and down, guided by the setscrew, to compensate for the above movements.

BRIEF DESCRIPTION OF THE DRAWINGS

The above features may be readily understood by referring to the drawings as described below, wherein:

FIG. 1 is a view of the spectacle frame from below and slightly left of center, in its correct orientation, the viewed portion will actually be facing forward, as are the binocular and spectacle frame in FIGS. 4 and 5;

FIG. 2 is a partially cross-sectional diagram taken through the slotted, triangular plate and nosepiece plate, showing the setscrew for attaching the bow to the binocular adjustably and and also the screw for adjustably attaching the nosepiece to its plate. The left wing 66' of the bow has been cut off and removed;

FIG. 3 is a small view of the binocular B without the spectacle bow to show the eyepiece barrels, large mirror covers, the hinge connecting the two body shells of the two telescopes and the tapped hole in the hingepost, all features relevant to the attachment of the spectacle frame. A broken line superimposed on the left telescope shows how the upper and lower frusto-conical tubular shell portions of each telescope body shell join at right angles to form a right angle space (L). It is also apparent that the vertical disposition of the larger facet of the generally vertically-placed larger mirror cover on the eyepiece side of the binocular lends itself to the molding of a suitable spectacle bow for the described use.

FIG. 4 is a drawing of the binocular with the spectacle frame bow mounted on it, showing the parts as they would appear when adjusted for a person with the extreme interpupillary spacing of 75 mm. Note that the eyepieces of the binocular are hinged outwardly and upwardly the extreme amount, requiring that the nosepiece be lowered the extreme amount. Therefore, the setscrew, attaching the binocular to the bow is at the bottom end of the slot in the triangular central portion of the bow. Note that the nosepiece is missing from the noseplate.

FIG. 5 is a drawing of the binocular with the spectacle frame bow mounted on it, showing the parts as they would appear when adjusted for a person with the narrowest interpupillary spacing of 55 mm. Note that the eyepieces of the binocular are hinged inwardly and downwardly the extreme amount, requiring that the nosepiece be raised the extreme amount. Therefore, the setscrew, attaching the binocular to the bow is at the top of the slot in the triangular central portion of the bow. As above, the nosepiece is missing from the noseplate.

It will be noted that no earpieces or temples appear in the drawings. These parts of the spectacle frame are considered to be already in the art. The only claim for novelty, as illustrated in FIGS. 1 to 5, lies in the design of the spectacle bow and the use to which it is put.

BEST MODE FOR CARRYING OUT THE INVENTION

At this point a more precise description of the binocular which this novel spectacle frame uniquely fits, is needed. This small binocular, weighing no more than 3 ounces, consists of a pair of telescopes, (1' and 1) hinged together, with each telescope consisting of a body shell (2 and 3), having upper and lower generally frusto-conical tubular shell portions which have their axes at right angles to each other so as to subtend a right angle space opening outwardly (FIG. 3, L), and which are arranged with the small base of the upper shell portion intersecting the small base of the lower shell portion. Each body shell has an objective barrel (4 and 5) containing objective lens elements mounted on the large base of the upper shell portion and an eyepiece barrel containing lens elements mounted on the large base of the lower shell portion. Each body shell is precisely shaped to fit exactly the light path formed by the objective elements, so the four lightweight glass mirrors mounted, Porro 1 fashion, in the shell are of different sizes and precisely oval in shape to accomodate the light bundle exactly. Two hoods or mirror covers enclose these mirrors, exactly conforming to their right-angle relationship to each other, the smaller of these, with a smaller and larger facet, being disposed on the front or objective side of the binocular, the larger (13 and 13'), with a smaller, lower facet and a larger, upper facet, being disposed on the eyepiece side of the binocular. This latter feature is used in mounting the spectacle frame's bow (65) for it uses the larger facet of the rearward-facing mirror cover as a guage, while fastening this bow with a setscrew (77) tapped into the binocular hinge post (78).

As seen in the drawings, this novel bow portion of the spectacle frame consists of the two wings 66 and 66', connected by a triangular flat plate 67 which has a long, vertical slot 68, terminated at the base of the triangle in a larger circular opening 69. Arising perpendicularly from the opposite end or apex of the triangular plate, is a slender pedestal 70, surmounted by the nosepiece plate 71, which is parallel to the triangular plate. The nosepiece plate has an oversize hole 72 for receiving the shank of the molded-in screw 73 of the nosepiece 74. A knurled, elongated nut 76 for securing nosepiece 74 to plate 71 is actually a threaded metal core, cast into plastic for finger turning. A novel feature of the bow 65 is that, once the correct interpupillary spacing is set on the binocular by a particular individual, the spectacle frame may be attached to the binocular quickly and in correct alignment with that person's eyes. This is due to the specific shape of the wings of the bow 66 and 66', which bend inward to contact the outer edges of the large, upper facets of the mirror covers 13 and 13', as seen in FIGS. 4 and 5.

In practice the interpupillar distance is set by an individual, somewhere between 55 mm and 75 mm. Then the binocular is fitted into the spectacle frame by inserting the head of the setscrew 77 (which has been partly unscrewed from the binocular hinge thread 75) through opening 69 in triangular plate 67, thus sliding the shank of the setscrew into the slot 68 downwardly as near to the lower end of the slot as possible. At that point the setscrew is tightened a little to snug the bow to the binocular. Then the binocular is moved upward in the slot toward the entry hole 69 until the wings 66 and 66' of the bow 65 contact the outer edges of the upper facets of mirror covers 13 and 13' of binocular B. As seen in FIG. 4, for an individual with an extreme interpupillary width of 75 mm, the setscrew 76 will be at the extreme bottom end of the slot 68 and will contact the upper facets of mirror covers 13 and 13' at point A on their outer edges. As seen in FIG. 5, for an individual with an interpupillary distance of only 55 mm, the setscrew will be tightened near the top of the slot, near the insertion hole 69, and the wings 66 and 66' of the bow 65 will contact the outer edges of the upper facets of mirror covers 13 and 13' at point B. Persons with intermediate interpupillary widths will have the setscrew setting somewhere between these extremes.

This invention provides a further adjustment in the nosepiece 74 to fine-tune the alignment with the users eyes two millimeters or so up and down and to right or left to accomodate for individual variations. Shim washers between nosepiece and noseplate are used to move the eyepieces outward farther from the eyes' for individuals having them protrude more than the norm set by the bow. The nosepiece 74 has a molded-in screw 73 with a narrow, threaded shank that fits through the overside hole 72 in the noseplate 71 with more than a 2 mm space on all sides, as described above. It is held to the nosepiece plate 71 by the knurled nut 76, also described above. In practice, with the binocular on the face of the user, this knurled nut is loosened with the fingers and the binocular simply moved about slightly on the frame, which remains fastened in position on the head. When alignment with the eyes is perfect, the nut is fingertightened. A hexagonal core may alternatively be molded into the outer end of this nut for easier manipulation with a long-shanked molded Allen wrench extending beyond the front of the binocular.

When the binocular B is worn on the spectacle bow, the wearer may view his surroundings with his normal vision by tilting his head upward slightly so as to see beneath the eyepiece barrels 6 and 7, even while walking, with no more obscuring of the vision than when he is wearing a visor. He also sees to the sides and above the rimless binocular field. When he wishes to see an object magnified, he simply tilts his head downward to look straight at it and the eye will automatically center it in the binocular field. There is no dark framing circle around the binocular field and, since the binocular is invisible to the wearer, due to the fact that its mass is on the forehead in the eyes' blindspot for the nose, it is important that the spectacle frame be also invisible to him—the primary improvement over the spectacle frame in U.S. Pat. No. 4,488,790. In the above manner the wearer of the spectacle binocular may switch between normal and magnified viewing as quickly as with bifocals.

Having thus described the invention, what I claim as new and desire to secure by Letter Patent is:

1. In combination with a binocular having a pair of telescopes, each including an eyepiece barrel and a larger mirror cover on the eyepiece side, and means including a hinge post hingedly connecting said telescopes together for adjustment of the interpupillary spacing of the eyepiece barrels, a spectacle frame including a bow but not a pair of earpieces extending backwardly from opposite ends of the bow, said earpieces being already in the art, first mounting means centrally secured to said bow, second mounting means secured to said hinge post, and means for securing said first and second mounting means together adjustably so that said bow may be engaged with the larger mirror covers when the relative position of the hinge post results in the positioning of the eyepiece barrels, as adjusted for proper interpupillary spacing, suitably for viewing through the barrels in correct alignment.

2. A combination as defined in claim 1 and wherein one of said first and second mounting means comprises a slotted plate with an opening at one end of the slot for admitting the head of a setscrew threaded into the hinge post of the binocular through the slot for adjustable tightenint it at a discrete point along the slot which will result in correct alignment for the viewer.

3. The combination of a binocular having a pair of telescopes each comprising a body shell having upper and lower generally frusto-conical tubular shell portions which have their axes positioned substantially at right angles to each other in order to subtend a right angle space, and which are arranged with the small base of the upper shell portion intersecting the small base of the lower shell portion, an objective lens-containing objective barrel mounted on the large base of said upper shell portion, an eyepiece lens-containing eyepiece barrel mounted on the large base of said lower shell portion, and a plurality of mirrors in said shell and arranged to provide a folded light path therethrough from said objective barrel to said eyepiece barrel, said mirrors being used to the very edge, precisely oval in shape and sized substantially or exactly to conform to the respective cross sections thereat of the light bundles transmitted by said objective lens;

a larger, rearward-facing mirror cover on the eyepiece side of the body shell, having larger upper and smaller lower facets, the upper facet employed for engaging the spectacle bow;

said binocular also having means including a hinge post hingedly connecting the shells of said telescopes together for adjustment of the interpupillary spacing of said eyepiece barrels, said hinge post having a tapped hole therein; and a spectacle-type mounting assembly comprising:

a spectacle frame including a bow, but not a pair of earpieces extending backwardly from opposite ends of the bow, the earpieces being already patented by others and in the art, a setscrew in a slot for holding bow and binocular hinge post adjustably in selected vertical positions relative to each other, for up and down adjustment of the position of the binocular hinge post relative to the position of the frame as worn by the user, in conformity with said adjustment of the interpupillary spacing of the eyepiece barrels, said bow arranged for engagement with the upper and outer surfaces of the larger binocular mirror covers when said relative position of the hinge post results in the positioning of the eyepiece barrels, as adjusted for proper interpupillary spacing, perfectly for viewing through the eyepiece barrels in correct alignment for the individual who set the interpupillary spacing.

4. A combination as defined in claim 3 wherein said bow is arranged for engagement with said upper shell portion, specifically of the larger facet or end of the larger mirror cover.

* * * * *